M. TIBBETTS.
MOTOR VEHICLE.
APPLICATION FILED SEPT. 7, 1915.
1,291,262.
Patented Jan. 14, 1919.
2 SHEETS—SHEET 1.
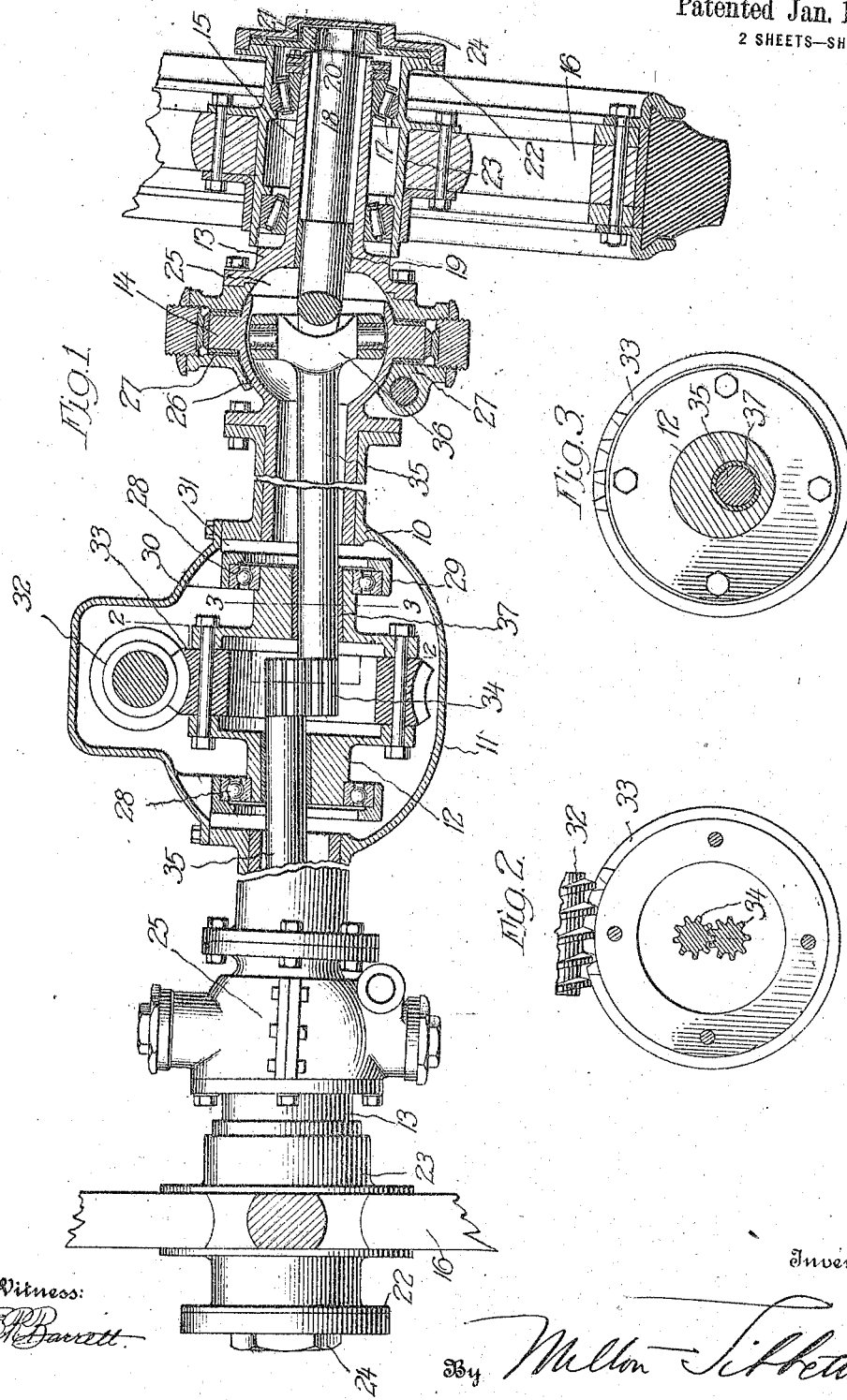
Witness:
E. P. Barrett
Inventor:
By Milton Tibbetts

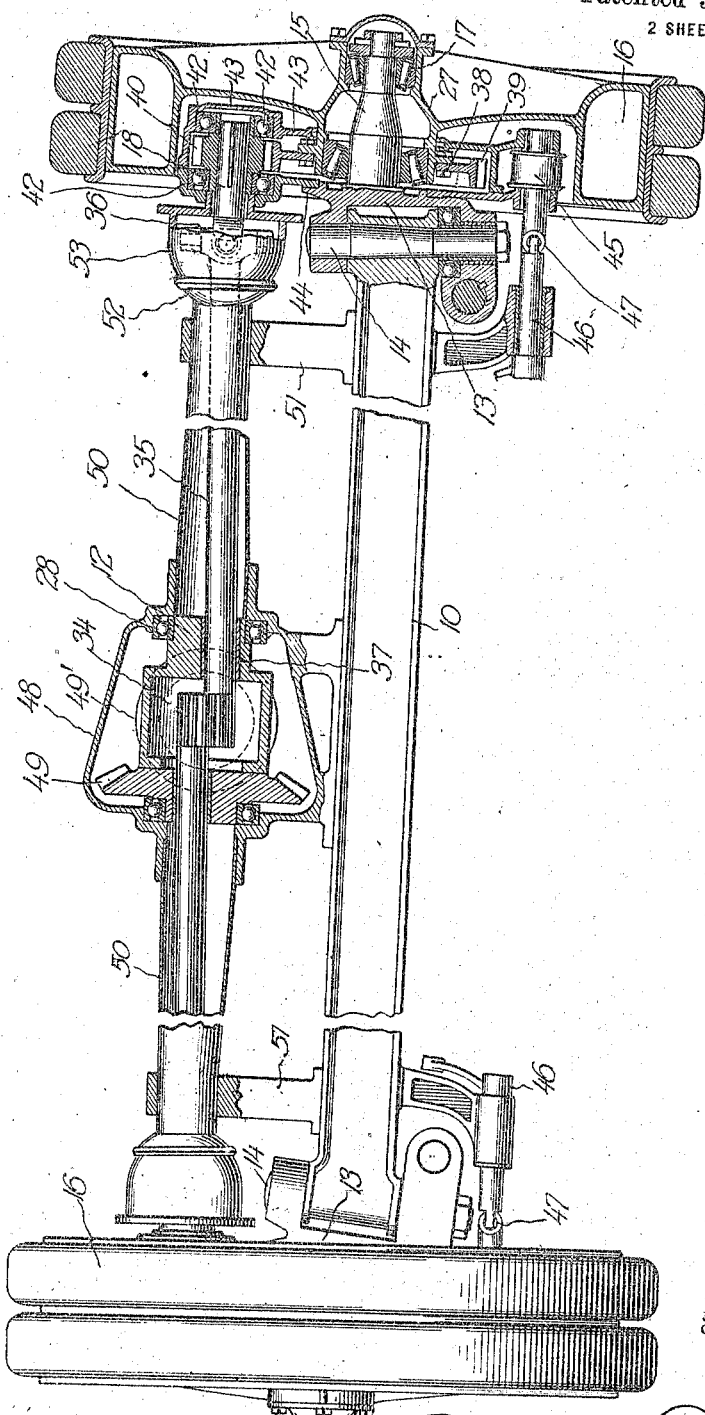

UNITED STATES PATENT OFFICE.

MILTON TIBBETTS, OF DETROIT, MICHIGAN, ASSIGNOR TO PACKARD MOTOR CAR COMPANY, OF DETROIT, MICHIGAN, A CORPORATION OF MICHIGAN.

MOTOR-VEHICLE.

1,291,262.

Specification of Letters Patent.   Patented Jan. 14, 1919.

Application filed September 7, 1915.   Serial No. 49,224.

*To all whom it may concern:*

Be it known that I, MILTON TIBBETTS, a citizen of the United States, and resident of Detroit, Wayne county, State of Michigan, have invented certain new and useful Improvements in Motor-Vehicles, of which the following is a specification.

This invention relates to motor vehicles, and particularly to the differential and driving mechanism thereof.

One of the objects of the present invention is to provide a combined steering and driving axle with a light and efficient differential and driving mechanism.

Another object of the invention is to provide an axle in which the axes of the traction wheels are slightly inclined with a simple and efficient form of differential and driving mechanism.

These and other objects of the invention will appear from the following description taken in connection with the drawings which form a part hereof, and in which:—

Figure 1 is a vertical section and part elevation of a vehicle axle embodying the invention;

Fig. 2 is a vertical section substantially on the line 2—2 of Fig. 1;

Fig. 3 is a vertical section substantially on the line 3—3 of Fig. 1; and

Fig. 4 is a vertical section and part elevation of an axle embodying another form of the invention.

Referring to the form of the invention shown in Figs. 1, 2 and 3, 10 represents a built-up supporting axle of a motor vehicle, the central part 11 forming an enlargement or casing for the differential gear support 12, and the outer ends 13 forming steering knuckles or spindles, pivoted to the main part of the axle as at 14. These pivots 14 are slightly inclined to the vertical, as is the usual practice in steering knuckles of the non-driving type, and the spindle portions 15 of the knuckles 13 are also at a slight angle to the horizontal, so that the wheels 16 which are mounted on the bearings 17 on said spindles 15 are also slightly inclined to the vertical but in the reverse direction from the inclination of the pivots 14, thus bringing the wheels where they contact with the ground somewhat closer to the extended axes of the pivots 14, to thus make steering easier. There is a short driving shaft 18 for each of the wheels, and in this form of the invention this shaft is mounted in a bearing 19 within the spindle 15 and its outer end is squared as at 20 to fit within a similar opening in a disk 21, which is bolted or otherwise secured to a flange 22 on the outer end of the hub 23 of the wheel 16. A cap 24 is secured over the end of the hub.

The inner portion of the steering knuckle 13 is substantially in the form of a cylindrical casing or enlargement forming a housing 25, which coöperates with the spherical end 26 of the main portion of the axle. Suitable bearings 27 are also provided in this portion of the knuckle for the pivot pin 14 above referred to.

As shown in this form of the invention, the differential gear support 12 is mounted in bearings 28 in lugs 29 extending from a cover 30 which closes an opening 31 in the upper part of the casing 11 of the axle, and it is driven by a worm 32 meshing with a worm wheel 33 secured to or forming a part of the differential gear support 12. It will be understood that the worm 33 is suitably connected with the motor of the vehicle for driving it.

What is termed a two-gear differential mechanism is mounted in the support 12 and connected to the shaft 18 for transmitting differentiated rotary motion from the support to the wheels. This differential or differential mechanism comprises a pair of meshing gears 34, shafts 35, and universal joints 36. The gears 34 are shown as spur gears, and they are arranged at a slight angle to the central axis of the main part of the axle 10 and to the axis of rotation of the differential gear support 12. The shafts 35 are mounted in diagonal bearings 37 in the support 12, and at their inner ends they are connected to the gears 34 and at their outer ends to the universal joints 36. As shown, the axes of the gears 34, if extended, would pass through the centers of the universal joints 36 in the housings 25. The shafts 35 are shown as diagonally arranged, being parallel to each other and offset.

It will be understood that the worm 32 drives the differential gear support 12 through the worm wheel 33, and said support 12 transmits its power to the shafts 18 through the shafts 35 and universal joints 36. The shafts 18 of course convey the power directly to the wheels 16. Also, it will be seen that the universal joints 36 compensate for the angularity of the shafts 35, for the inclination of the pivots 14 and spindles 15, and for the steering action of the knuckles 13. In this connection, it will be understood that any suitable mechanism may be used for steering the knuckles 13.

In the form of the invention shown in Fig. 4 the solid supporting axle 10 has a steering knuckle 13 pivoted at either end as by the inclined pivots 14. Mounted on bearings 17 upon the spindle portion 15 of each of the knuckles 13 is a wheel 16 having a hub 27. Secured to the inner end of the hub 27 as by the bolts 38 is a spur gear 39, with which meshes a pinion 40. Said pinion is keyed to a short shaft 18 mounted in bearings 42 in a casing or support 43 which is preferably built-up in sections and rigidly connected to the steering knuckle 13 as at the flange 44. Said casing 43 also supports a brake mechanism 45, the operating shaft 46 of which has a universal joint 47 arranged below and in line with the pivot 14 above referred to. Thus, the brakes may be operated in whatever position the steering knuckle 13 is turned.

The differential gear support 12 is mounted in bearings 28 in a casing 48, which is suitably supported above and upon the main supporting axle 10. Also, the support 12 has a driven bevel gear 49, which meshes with a driving pinion 49' connected to be driven by the vehicle motor.

The casing 48 has laterally extending tubular portions 50, the outer ends of which are supported by brackets 51 from the supporting axle 10, and the extreme ends of said portions 50 are formed with spherical parts 52, which coöperate with parts 53 of universal joint casings mounted on the support 43. The central point of each of these spherical universal joint casings is arranged in line with its respective pivot pin 14 so that the operation of the steering knuckles 13 about said pivots will not interfere with the continuity of the inclosing casing extending from the differential gear support 12 to the short shaft 18.

Within the support 12 and the casings 48 and 50 are diagonally arranged gears 34 and shafts 35 like those shown in Fig. 1. The shafts are mounted in similar bearings 37 and are connected to the short shafts 18 by universal joints 36 mounted within the universal joint casings. In this construction also, the universal joints 36 compensate for the angularity of the shafts 35, for the inclination of the pivots 14 and spindles 15, and for the steering action of the knuckles 13.

While but two embodiments of the invention are herein shown and described, it will be understood that the invention is not limited to these embodiments nor to the details of construction shown, and it will be apparent that changes may be made without departing from the spirit or scope of the invention.

Having thus described my invention, what I claim and desire to secure by Letters Patent is:—

1. In a motor vehicle, in combination, a supporting axle having pivoted steering knuckles, wheels mounted on said knuckles, shafts connected to drive said wheels respectively, and a two gear differential mechanism including universal joints connected to said shafts and arranged in line with the pivots of said knuckles.

2. In a motor vehicle, in combination, a supporting axle having inclined pivoted steering knuckles, wheels mounted on said knuckles, shafts connected to drive said wheels respectively, and a two gear differential mechanism including universal joints connected to said shafts and arranged in line with the pivots of said knuckles.

3. In a motor vehicle, in combination, a supporting axle having pivoted steering knuckles, wheels mounted on said knuckles, shafts connected to drive said wheels respectively, and a differential mechanism including parallel offset shafts geared together and universal joints connecting said parallel shafts to the wheel shafts and arranged in line with the pivots of said knuckles.

4. In a motor vehicle, in combination, a supporting axle having pivoted steering knuckles, wheels mounted on said knuckles, a differential gear support, a pair of intermeshing gears mounted diagonally in said support, a universal joint arranged in line with the pivot of each of said steering knuckles, shafts connecting said gears and joints respectively, and a driving connection from said joints to the respective wheels.

5. In a motor vehicle, in combination, a supporting axle having pivoted steering knuckles, wheels mounted on said knuckles, a differential gear support, a pair of intermeshing gears mounted diagonally in said support, a universal joint arranged in line with the pivot of each of said steering knuckles, shafts connecting said gears and joints respectively, and a geared driving connection from said joints to the respective wheels.

6. In a motor vehicle, in combination, a supporting axle having pivoted steering knuckles, wheels mounted on said knuckles, a differential gear support, a pair of intermeshing gears mounted diagonally in said support, a universal joint arranged in line with the pivot of each of said steering knuckles, shafts connecting said gears and joints respectively, and a spur gear driving connection from said points to the respective wheels.

7. In a motor vehicle, in combination, a tubular supporting axle having wheels mounted at its outer ends and having a central enlargement and enlargements at its ends immediately inside the wheels, a differential gear support mounted in the central enlargement, and a two gear differential mechanism carried by said support and including universal joints in said end enlargements.

8. In a motor vehicle, in combination, a tubular supporting axle having wheels mounted at its outer ends and having a central enlargement and enlargements at its ends immediately inside the wheels, a differential gear support mounted in the central enlargement, a two gear differential mechanism carried by said support and including universal joints in said end enlargements, and shafts connecting said joints with the wheels.

9. In a motor vehicle, in combination, a supporting axle having pivoted steering knuckles, wheels mounted on said knuckles, a differential gear support mounted in said axle, means for driving said support, and means for transmitting differentiated motion from said support to said wheels comprising diagonally arranged shafts geared together and having universal joints in line with the pivots of said knuckles.

10. In a motor vehicle, in combination, a supporting axle having pivoted steering knuckles, wheels mounted on said knuckles, a differential gear support mounted in said axle, means for driving said support, and means for transmitting differentiated motion from said support to said wheels comprising inner shaft sections directly geared together, outer shaft sections connected to the wheels, and universal joints in line with the pivots of the knuckles and connecting the inner and outer shaft sections.

11. In a motor vehicle, in combination, a supporting axle having a central portion and inclined end portions, wheels mounted at the ends of said axle, a differential gear support mounted to rotate in the central portion of the axle, a pair of intermeshing gears mounted diagonally in said support, and universally jointed shafts extending from said gears to the respective wheels, the universal joints being arranged at the joints between the central and inclined portions of the supporting axle.

In testimony whereof I affix my signature.

MILTON TIBBETTS.